United States Patent [19]

Blaskowitz et al.

[11] Patent Number: 5,518,515
[45] Date of Patent: May 21, 1996

[54] DEVICE FOR SEPARATING ONE OR MORE STRANDS OF MOLTEN GLASS INTO INDIVIDUAL GLASS GOBS

[75] Inventors: Wolfgang Blaskowitz, Gelsenkirchen-Buer; Hans-Jürgen Daum, Aichstetten, both of Germany

[73] Assignee: GPS-Glasproduktions- Service GmbH, Essen, Germany

[21] Appl. No.: 204,230

[22] PCT Filed: Jun. 24, 1993

[86] PCT No.: PCT/EP93/01610

§ 371 Date: Mar. 4, 1994

§ 102(e) Date: Mar. 4, 1994

[87] PCT Pub. No.: WO94/01371

PCT Pub. Date: Jan. 20, 1994

[30] Foreign Application Priority Data

Jul. 8, 1992 [DE] Germany ............... 42 22 310.5

[51] Int. Cl.⁶ ........................................... C03B 7/10
[52] U.S. Cl. .............. 65/334; 65/207; 65/324; 83/623; 83/628
[58] Field of Search ............ 83/623, 628; 65/174, 65/207, 324, 334

[56] References Cited

U.S. PATENT DOCUMENTS

| | | | |
|---|---|---|---|
| 2,238,283 | 4/1941 | Pearson | 83/623 |
| 2,269,553 | 1/1942 | Roessler | 65/334 |
| 2,271,271 | 1/1942 | Meyers | 49/14 |
| 4,699,643 | 10/1987 | Kulig | 65/332 |

FOREIGN PATENT DOCUMENTS

| | | |
|---|---|---|
| 490294A1 | 6/1992 | European Pat. Off. |
| 164902 | 12/1995 | European Pat. Off. |
| 4104495 | 2/1991 | Germany |
| 1435548 | 4/1987 | U.S.S.R. |

*Primary Examiner*—David L. Lacey
*Assistant Examiner*—Sean Vincent
*Attorney, Agent, or Firm*—Herbert Dubno

[57] ABSTRACT

A strand of glass is cut into gobs by a pair of opposing shearing blades driven by a crank drive in which eccentric pins from a crank disk are connected to a support disk of a crankshaft and a support disk on an auxiliary shaft, connecting rods being linked to the pins and operatively connected to the support arms of the blades.

4 Claims, 2 Drawing Sheets

DEVICE FOR SEPARATING ONE OR MORE STRANDS OF MOLTEN GLASS INTO INDIVIDUAL GLASS GOBS

CROSS REFERENCE TO RELATED APPLICATIONS

This is a national phase of PCT/EP 93/01610 filed 24 Jun. 1993 and based upon German national application P 42 22 310.5 filed 8 Jul. 1992 under the International Convention.

FIELD OF THE INVENTION

The invention relates to a device for subdividing one or more strands of molten glass into individual glass gobs, the apparatus having a number of shearing blade pairs corresponding to the number of strands to be subdivided. One shearing blade of each shearing blade pair is arranged on one support arm and the other shearing blade of each shearing blade pair is arranged on a second support arm and the support arms are moved towards and away from each other by with a drive unit.

BACKGROUND OF THE INVENTION

Devices known to date of the aforementioned kind are either of a comparatively complicated construction or they do not meet the requirements regarding the simultaneity of movement of the support arms and/or the positioning accuracy of the device components.

OBJECT OF THE INVENTION

It is the object of the invention to provide a device for subdividing one or more strands of molten glass into individual glass gobs, wherein with comparatively simple structure an accurate simultaneous operation of the cooperating device components and a high positioning precision of these components are insured.

SUMMARY OF THE INVENTION

According to the invention this object is achieved in the fact that the drive unit has a bidirectionally operable crankshaft, by means of which two crank pins mutually staggered by 180 degrees can be moved. A first of these pins is operationally connected to the first support arm via a first connecting rod and the second pin is operationally connected via a second connecting rod with the second support arm. With the device design according to the invention for cutting one or more strands of molten glass into individual glass gobs it is insured that both shearing blades of a shearing blade pair can be moved simultaneously with precision, and it is furthermore insured that the shearing blades of a shearing blade pair assume the same position in each cutting sequence. End way it is possible to subdivide a strand of molten glass into gobs of fully identical volume, weight and shape.

Provided that each crankshaft is connected at its remote end with respect to the crank pin with a positioning element moving back and forth with the cranking or swinging motion of the crankshaft, this element being in turn operationally connected with the corresponding support arm, it is insured that the cranking motion of the crankshaft or of the connecting rod is reliably translated in a corresponding stroke of the support arm assigned to the respective connecting rod.

When the positioning element is designed like a connecting strip which can be mounted on a rectilinearly guided rod assembly connected with the corresponding support arm at its remote end with respect to the connecting strip, a precisely rectilinear stroke of the support arm is achieved. By means this rectilinear stroke a constant cutting process of high quality can be insured.

A further improvement of the positioning precision of the support arms and thereby of the shearing blades is achieved when the rod assembly cooperating with the connecting strip has at least two mutually parallel rods mounted with two bearings.

For further enhancement of the positioning accuracy of the device components, in a preferred embodiment of the invention each rod is supported in a first bearing arranged on the side of the connecting strip facing the crankshaft and in a second bearing arranged on the side of the connecting strip facing away from the crankshaft, whereby the distance between the first bearing and the second bearing in the direction of the connecting strip movement is sufficient to allow for each of them the stroke of the connecting strip required during operation and during maintenance.

Provided that both crank pins are arranged on a crank disk arranged nonrotatably and axially nondisplaceable with respect to the crankshaft, the stroke produced by the connecting rods can be increased by increasing the diameter of the crank disk.

A particularly wear-resistant and thereby operationally safe design of the device of the invention results when each crank pin passes through the respective connecting rod, whereby the first crank pin is mounted at its end remote from the crank disk on a first support disk, and the second crank pin is mounted at its remote end from the crank disk on a second support disk, which are connected nonrotatably and axially nondisplaceable with a bearing axle aligned with the crankshaft, and whereby the distance between the crank disk and the support disks corresponds approximately to the dimension of the connecting rod in the axial direction of the crankshaft. Thereby in addition a reliable fixing of the connecting rods in the axial direction of the crankshaft is achieved, which contributes to uniformity of the crank stroke of the connecting rods.

Advantageously the drive unit is designed as a servomotor, which is adjusted so that the speed of the movement of the support arms reaches a maximal value during the cutting of the strand of molten glass, thereby insuring an optimal cutting process.

SPECIFIC DESCRIPTION

Figure 1:
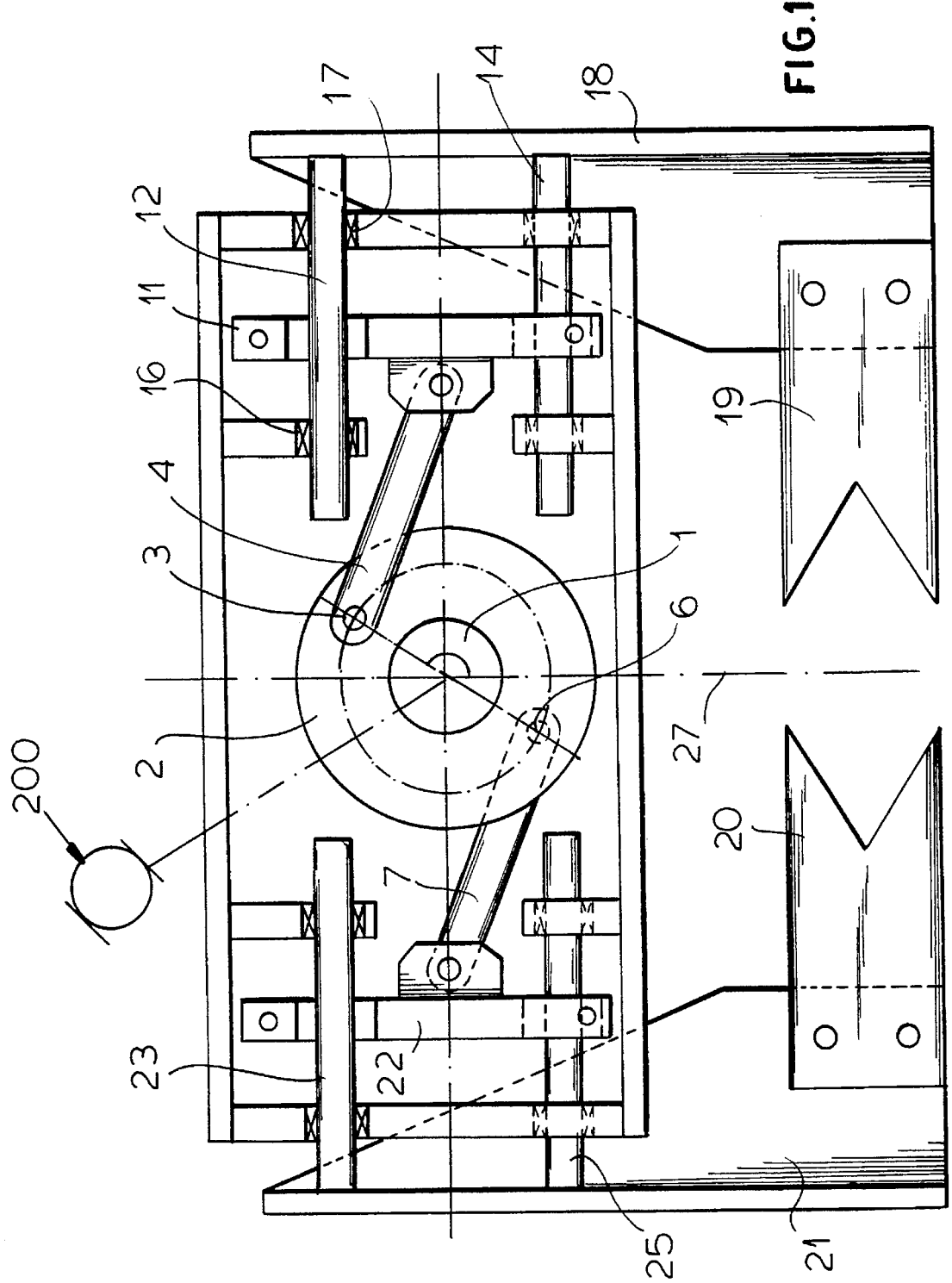
FIG. 1 is a top view of a device according to the invention for separating one or more strands of molten glass into individual gobs.
Figure 2:
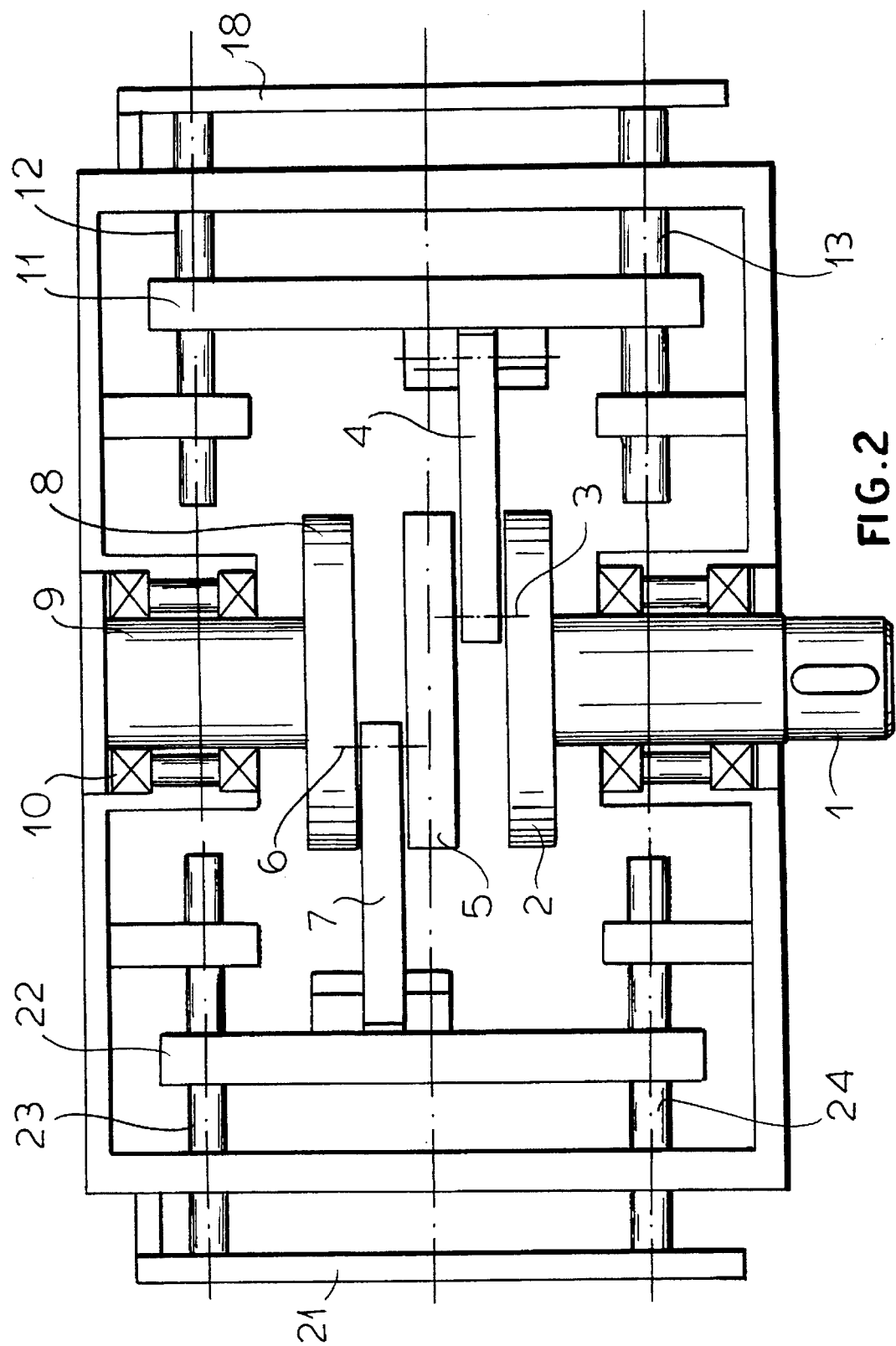
FIG. 2 is a side view of the device of FIG. 1.

A device according to the invention for subdividing one or more strands of molten glass into individual gobs, as shown in FIGS. 1 and 2, has a drive unit. Advantageously this unit is a servomotor 200 which drives the crankshaft via a transfer case with a transmission ratio of i=10:1.

The servomotor is controlled so that the maximal value of its rotational speed is reached during the cutting process by which the strand of molten glass is cut with the subsequently described device components, whereby the cutting process is optimized. During the return stroke of the subsequently described device components, the rotational speed of the servomotor is reduced towards zero, whereby the servomotor remains in a waiting position shortly after its reversal of rotation. For the following cutting step the servomotor is brought from zero to the maximum value of its rotational speed within one half of the motion cycle. In the aforementioned transfer case five revolutions of the servomotor are available for the increase to maximal value of the rotational speed of the servomotor.

The transfer case is gearing with minimal play, in order to avoid to a great extent lack of precision in the positioning of further device components.

At the output part of the transfer case sits the crankshaft 1, which during the work cycle of the servomotor performs a rotation of 180 degrees in one direction and in the subsequent work cycle of the servomotor performs a rotation of 180 degrees in the opposite direction.

The crankshaft 1 is firmly connected in its rotational and axial direction with a first support disk 2, coaxially arranged with respect to the crankshaft 1. On the backside of the first support disk 2 a crank pin 3 is mounted.

The first crank pin 3 traverses through a correspondingly designed bore of a first connecting rod 4 and is mounted with its segment projecting beyond the first connecting rod 4 to the front side of a crank disk 5.

Staggered by 180 degrees with respect to the first crank pin 3, on the backside of crank disk 5 a second crank pin 6 is mounted. The latter traverses through a correspondingly designed bore of a second connecting rod 7 and is mounted with its segment projecting beyond the second connecting rod 7 to the front side of a second support disk 8.

The second support disk 8 sits nonrotatably and axially nondisplaceable on a bearing axle 9, which is rotatable supported in a shaft bearing 10 at its end segment opposite to the support disk.

The device components attached to the first connecting rod 4 correspond from the point of view of their design, function and effect to the components attached to the second connecting rod 7, so that subsequently only the former are described.

The first connecting rod 4 is linked at its end remote from the crank pin 3 to a positioning element designed as a connecting strip 11. The connecting strip 11 has four bores, which by means of connection devices not shown in detail are attached firmly to four rods in the form of hollow bars 12, 13, 14, . . .

At a sufficient distance on both sides of the connecting strip 11, each hollow bar 12, 13, 14, . . . is movably supported and guided respectively in a first bearing 16 and a second bearing 17 in the stroke direction of the first connecting rod 4, so that the crank motion or stroke of the first connecting rod 4 is translated into a linear to and fro motion of the connecting strip 11.

At their ends remote from the crankshaft, the mutually parallel hollow shafts 12, 13, 14, . . . of equal length are rigidly connected with a mounting segment of the first support arm 18.

On the first support arm 18 a first shearing blade 19 is arranged, which together with a second shearing blade 20, connected to a second support arm 21 which correspondingly to the first support arm 18 is connected to the second connecting rod 7 by means of a second connecting strip 22 and further hollow shafts 23, 24, 5, 26, forms the shearing blade pair 19, 20 cutting across a strand of molten glass not shown in the drawing.

In the following the modus operandi of the aforedescribed device for the separation of one or more strands of molten glass into individual lumps is described.

In a starting position both crank pins 3, 6 are located on a dash-dot line 27 as shown in FIG. 1.

When the crankshaft 1 is rotated clockwise by 90 degrees from its starting position, the connecting strips 11, 22 travel from their closest position to the crankshaft 1 to the position most remote from crankshaft 1, i.e. the support arms 18, 21 are moved from the cutting into the waiting position.

During a further clockwise rotation of the crankshaft 1 by 90 degrees, the connecting strips 11, 22 travel from their most remote position with respect to the crankshaft 1 to their closest position with respect to the crankshaft 1, i.e. the support arms 18, 21 are moved from the waiting position into the cutting position.

We claim:

1. A device for cutting a strand of glass into gobs, comprising:

a pair of opposing shearing blades for receiving a strand of glass between them and displaceable toward one another and away from one another for cutting a gob from the strand;

a first support arm on one of said blades and a second support arm on the other of said blades;

a first connecting rod connected to said first support arm and a second connecting rod connected to said second support arm; and a drive operatively connected to said connecting rods for displacing said blades, said drive comprising:
a bidirectionally rotatable crankshaft,
a first support disk axially fixed to one end of said crankshaft,
a second support disk axially aligned with said first support disk and spaced therefrom,
a bearing axle supported in longitudinal alignment with said crankshaft and fixed at one end to said second support disk,
a crank disk received between said support disks and axially nondisplaceable relative to said crankshaft,
a first crank pin eccentric to said crankshaft and having one end mounted to said first support disk, extending through said first connecting rod and having another end mounted to said crank disk, and
a second crank pin eccentric to said crankshaft, said second crank pin having one end mounted to said second support disk, extending through said second connecting rod and having another end mounted to said crank disk offset from said fast crank pin by 180°, said first support disk and said second support disk being spaced from said crank disk by the approximate dimensions of said first and second connecting rods respectively in an axial direction of said crankshaft.

2. The device for cutting a strand of glass as defined in claim 1 further comprising a positioning element connected to each of said connecting rods respectively and guided for linear movement, each of said support arms being connected to a one of said positioning elements respectively.

3. The device for cutting a strand of glass as defined in claim 2 wherein each of said positioning elements is a connecting strip provided with a plurality of guide bars mounted in bearings defining linear paths for said guide bars.

4. The device for cutting a strand of glass as defined in claim 1 wherein said drive comprises a servomotor driving said support arms so that they achieve a maximum speed during the cutting of said strand.

* * * * *